United States Patent Office 3,705,902
Patented Dec. 12, 1972

3,705,902
CERTAIN 2 - ARALKYL - 8-FLUORO-1,2,3,4-TETRA-HYDRO-5-PROPIONYL-PYRIDO[3,4-b]INDOLES
David Lyon Garmaise, Montreal, and Gerard Yvon Paris, Duvernay, Canada, and Nicholas Peter Plotnikoff, Lake Bluff, Ill., assignors to Abbott Laboratories, North Chicago, Ill.
No Drawing. Filed May 3, 1971, Ser. No. 139,901
Int. Cl. C07d 31/44
U.S. Cl. 260—295 C    3 Claims

ABSTRACT OF THE DISCLOSURE

2 - aralkyl-8-fluoro-1,2,3,4-tetrahydro - 5 - propionyl-pyrido[4,3-b]indoles have been found to be powerful antidepressants when administered to warm-blooded animals.

DETAILED DESCRIPTION OF THE INVENTION

Certain 2-aralkyl-8-fluoro-1,2,3,4-tetrahydro - 5 - propionyl-pyrido[4,3-b]indoles, more commonly and herein below simply referred to as 2-aralkyl-5-propionyl-8-fluoro-γ-carbolines have been discovered to have strong antidepressant activity at doses representing only a small fraction of an amount that would show any toxic manifestations. The compounds to which this invention is directed have the formula

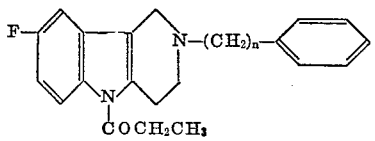

wherein $n$ is 1 or 2. These compounds show an oral $LD_{50}$ in mice of >1000 mg./kg. while strong anti-depressant effects are observed with ≤25 mg./kg. by oral administration.

The new compounds are generally prepared by heating a stirred mixture of 8-fluoro-γ-carboline carrying in the 2-position a benzyl or phenethyl substituent in an inert solvent with propionic anhydride and an acid acceptor. In a preferred embodiment, the heating is done in a nitrogen atmosphere. The reaction mixture is evaporated under reduced pressure after condensation has been effected and the residue is taken up in a suitable solvent and recrystallized from ethanol.

As an illustration but without intention to limit the present invention, the following detailed examples are given:

EXAMPLE 1

(a) A solution of 29.7 g. of 8-fluoro-γ-carboline and 14.5 g. of 2-bromoethylbenzene in 500 ml. of N,N-dimethylformamide was heated at 85–90° C. for 4 hours. Subsequent removal of the solvent yielded an oily residue which was treated with 200 ml. of acetone. The insoluble organic solvent was filtered off and the filtrate was evaporated. The oily residue was recrystallized from a minimum amount of ethanol, yielding 17 g. of 2-(β-phenethyl)-8-fluoro-γ-carboline (73% of theory), melting at 160–2° C.

(b) A solution of 6.4 g. of 2-(β-phenethyl)-8-fluoro-γ-carboline in 20 ml. of propionic anhydride and 20 ml. of pyridine was heated to 80° C. for 2 hours and subsequently evaporated to dryness. The residue was extracted with 300 ml. of petroleum ether (B.P. 90–120°) and the unreacted material (1.1 g.) was filtered off. The filtrate was concentrated and upon cooling, 2-(β-phenethyl)-5-propionyl - 8 - fluoro-γ-carboline precipitated. The pure compound, obtained in a yield of 29% of theory after recrystallization from ethanol melts at 120–2° C.

EXAMPLE 2

(a) A mixture of 36.2 g. of 8-fluoro-γ-carboline hydrochloride, 31 g. of benzylbromide, 44 g. of potassium carbonate and 26.6 g. of potassium iodide was heated and stirred in 500 ml. of N,N-dimethylformamide at 80° for 7 hours. After cooling, the reaction mixture was poured into water and extracted therefrom with chloroform. The washed and dried chloroform extract was evaporated to yield 17.2 g. of 2-benzyl-8-fluoro-γ-carboline melting at 157–9° C.

(b) A mixture of 9 g. of the above, 30 ml. of propionic anhydride and 30 ml. of pyridine was heated at 140° C. for 24 hours under a nitrogen atmosphere and with stirring. Subsequently, the pyridine and excess propionic anhydride was stripped off under reduced pressure and the crude product was recrystallized from methanol, yielding 6 g. (62.5% of theory) of 2-benzyl-5-propionyl-8-fluoro-γ-carboline. An analytically pure sample melted at 109–10° C. after recrystallization from methanol.

The anti-depressant activity of the above compounds was measured by the method of G. Everett, described in Excerptia Int. Congress, Series 122, pages 164–7. This test is commonly referred to as "modified DOPA-test" and uses an activity scale of 1–3 with activity 3 signifying a pronounced anti-depressant effect. The compound described in Example 1 above shows activity 3 at an oral dose of 25 mg./kg. in mice after 4 hours and an activity 2 reading after 8 hours. The compound of Example 2 shows activity 2 at 25 mg./kg. after 4 hours.

Although the compounds described above are shown only in the form of their free base, it is to be understood that acid addition salts thereof may be made by simple and standard procedures. Where the acid addition salts are formed with nontoxic organic or inorganic acids, the salts may equally well be therapeutically used as effective anti-depressants. Among such salts, the hydrochloride, sulfate, phosphate, citrate, succinate, acetate and tartrate are particularly useful.

We claim:
1. The compound of the formula

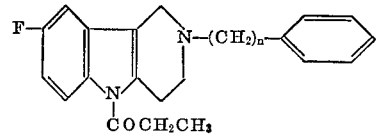

wherein $n$ is 1 or 2 or a non-toxic acid addition salt thereof.
2. The compound of claim 1 wherein $n$ is 1.
3. The compound of claim 1 wherein $n$ is 2.

References Cited
UNITED STATES PATENTS
3,382,250    5/1968    Johnson et al. _____ 260—296 A ALAN L. ROTMAN, Primary Examiner U.S. Cl. X.R.
260—296 A; 424—266